(12) United States Patent
Doyle

(10) Patent No.: US 7,310,679 B1
(45) Date of Patent: Dec. 18, 2007

(54) METHOD AND SYSTEM FOR TRANSMITTING VIDEO CONTENT WHILE PREVENTING OTHER TRANSMISSIONS IN A CONTENTION-BASED NETWORK

(75) Inventor: James Doyle, Toronto (CA)

(73) Assignee: ViXS Systems Inc., Toronto, Ontario (CA)

( * ) Notice: Subject to any disclaimer, the term of this patent is extended or adjusted under 35 U.S.C. 154(b) by 869 days.

(21) Appl. No.: 10/134,933

(22) Filed: Apr. 29, 2002

(51) Int. Cl.
G06F 13/00 (2006.01)

(52) U.S. Cl. ..................................... 709/231

(58) Field of Classification Search .............. 709/231, 709/232; 455/411
See application file for complete search history.

(56) References Cited

U.S. PATENT DOCUMENTS

| | | |
|---|---|---|
| 4,866,395 A | 9/1989 | Hosteller |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |
| 5,635,985 A | 6/1997 | Boyce et al. |
| 5,644,361 A | 7/1997 | Ran et al. |
| 5,652,749 A | 7/1997 | Davenport et al. |
| 5,732,391 A | 3/1998 | Fiocca |
| 5,737,020 A | 4/1998 | Hall et al. |
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |
| 6,005,623 A | 12/1999 | Takahashi et al. |
| 6,005,624 A | 12/1999 | Vainsencher |
| 6,014,694 A | 1/2000 | Aharoni et al. |
| 6,040,863 A | 3/2000 | Kato |
| 6,081,295 A | 6/2000 | Adolph et al. |
| 6,141,693 A | 10/2000 | Perlman et al. |
| 6,144,402 A | 11/2000 | Norsworthy et al. |
| 6,167,084 A | 12/2000 | Wang et al. |
| 6,182,203 B1 | 1/2001 | Simar, Jr. et al. |
| 6,215,821 B1 | 4/2001 | Chen |
| 6,219,358 B1 | 4/2001 | Pinder et al. |
| 6,222,886 B1 | 4/2001 | Yogeshwar |
| 6,236,683 B1 | 5/2001 | Mougeat et al. |

(Continued)

FOREIGN PATENT DOCUMENTS

EP 0661826 A2 7/1995

(Continued)

OTHER PUBLICATIONS

U.S. Appl. No. 60/346,991 to Hirsch et al.*

(Continued)

*Primary Examiner*—Robert B Harrell

(57) ABSTRACT

A plurality of wireless clients that can operate in a shared manner using a contention based protocol are placed into a contention free mode of operation that prevents the wireless clients from initiating a data transfer. Once the wireless clients are prevented from initiating access to the wireless network, a video gateway can transmit video content in a deterministic manner to one or more of the plurality of wireless clients.

20 Claims, 5 Drawing Sheets

U.S. PATENT DOCUMENTS

| | | | |
|---|---|---|---|
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,459,891 | B1 * | 10/2002 | Whinnett et al. ........... 455/411 |
| 6,480,541 | B1 | 11/2002 | Girod et al. |
| 6,526,099 | B1 | 2/2003 | Chistopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Takahashi et al. |
| 2002/0110193 | A1 | 8/2002 | Kyoon et al. |
| 2002/0138259 | A1 | 9/2002 | Kawahara |
| 2002/0145931 | A1 | 10/2002 | Pitts |
| 2002/0196851 | A1 | 12/2002 | Arnaud |
| 2003/0093661 | A1 | 5/2003 | Loh et al. |
| 2003/0152148 | A1 | 8/2003 | Laksono |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Pedro Assuncao and Mohammad Ghandbari, "Rate Reduction Techniques for MPEG-2 Video Bit Streams," SPIE vol. 2952, Apr. 1996, 10 pp.

Jae-Yong Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp., date unknown.

Luis Ducla Soares et al., "Influence of Encoder Parameters on the Decoded Video Quality for MPEG-4 Over W-CDMA Mobile Networks," NTT DoCoMo, Inc. technical paper, 4 pp., date unknown.

Thomas Wiegand et al., "Long-Term Memory Motion-Compensated Prediction for Robust Video Transmittion," in Proc. ICIP2000, 4 pp.

P. Greg Sherwood et al., "Efficient Image and Channel Coding for Wireless Packet Networks," Univ. of CA, San Diego, CA, Dept. of ECE; 4 pp. date unknown.

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 02-05, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. Jun. 3, 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter,"DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, Calfiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decorder Buffering," Chapman and Hall Digital Multimedia Standards Series, pp. 340-356, XP002115299, ISBN: 0-412-0877-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rinformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

Lengwehasatit, Krisda et al., "Computationally Scalable Partial Distance Based Fast Search Motion Estimation," Packet Video Corp., San Diego, California, date unknown.

Soares, Luis Ducla, et al., "Influence of Encoder Parameters on the Decoded Video Quality for MPEG-4 Over W-CDMA Mobile Networks," NTT DoCoMo, Inc., date unknown.

Sherwood, P, Greg et al., "Efffcient Image and Channel Coding for Wireless Packet Networks," University of California, La Jolla, California, date unknown.

Fan, Zhigang et al. "Maximum Likelihood Estimation of JPEG Quantization Table in the Identification of Bitmap Compression History," Xerox Corporation, Webster, New York, date unknown.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India, date unknown.

Kroner, Sabine et al., "Edge Preserving Noise Smoothing With An Optimized Cubic Filter," DEEI, University of Trieste, Trieste, Italy, date unknown.

Kim, Jaemin et al., "Spatiotemporal Adaptive 3-D Kalman Filter for Video," pp. 1-12. Samsung Semiconductor, Inc. San Jose, California, date unknown.

Jostschulte, K. et al., "A Subband Based Spatio- Temporal Noise Reduction Technique for Interlaced Video Signals," University Dortmund, Dortmund, Germany, date unknown.

Brandenburg, Karlheinz, "MP3 and AAC Explained," Proceedings of AES 17th International Conference, XP008004053, pp. 99-110, Erlangen, Germany, date unknown.

Hassanzadegan, Hooman et al., "A New Method for Clock Recovery in MPEG Decoders," pp. 1-8, Basamad Negar Company, Tehran, Iran, date unknown.

Kan, Kou-Sou et al., "Low-Complexity and Low-Delay Video Transcoding for Compressed MPEG-2 Bitstream," Natinal Central University, Chung-Li, Taiwan, date unknown.

Mitchell et al., "MPEG Video Compression Standard: 15.2 Encoder and Decoder Buffering," Chapman and Hall Digital Multimedia Standards Series, pp. 340-356, XP002115299, ISBN: 0-412-08771-5, Chapman and Hall, New York, date unknown.

Oz, Ran et al., "Unified Headend Technical Management of Digital Services," BigBend Networks, Inc., date unknown.

* cited by examiner

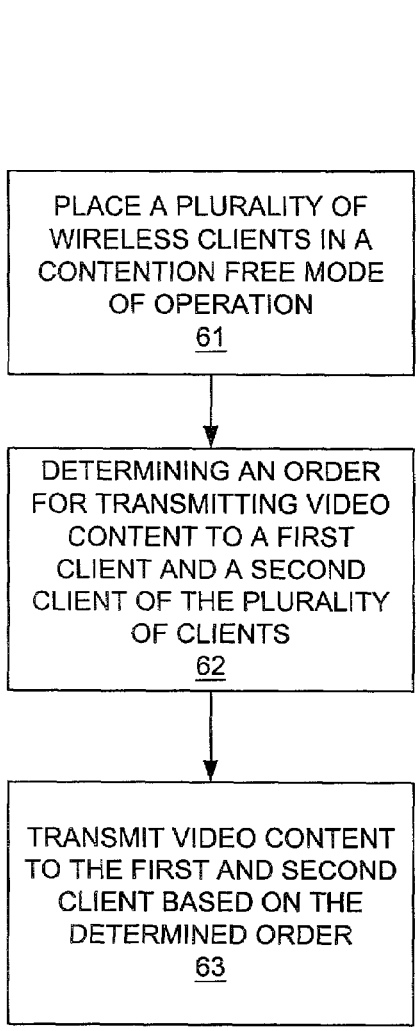
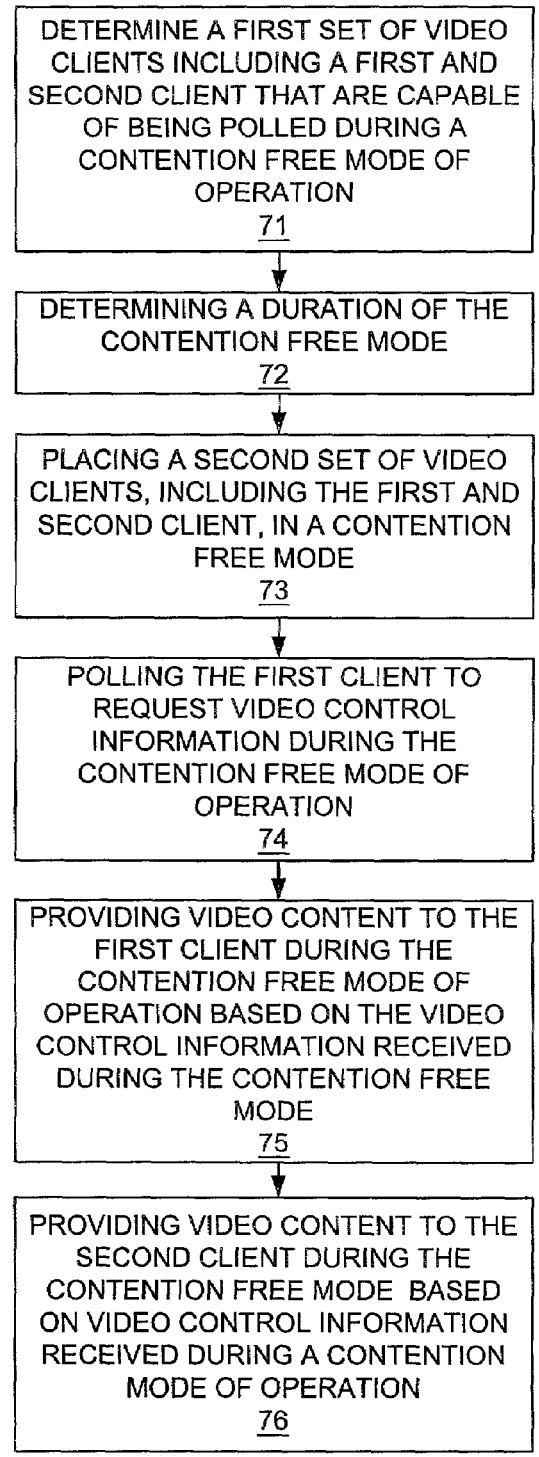
FIG. 7
FIG. 8

METHOD AND SYSTEM FOR TRANSMITTING VIDEO CONTENT WHILE PREVENTING OTHER TRANSMISSIONS IN A CONTENTION-BASED NETWORK

FIELD OF THE DISCLOSURE

The present disclosure relates generally to the transmission of video data and more particularly to the transmission of video data over a wireless environment.

BACKGROUND

As the bandwidth available to wireless devices has increased, it has become possible to deliver digital video of respectable quality to wireless display devices such as portable notebook computers. Accordingly, methods have been developed to deliver video content to a plurality of wireless display devices using a carrier sense multiple access protocol with collision avoidance medium sharing (CSMA/CA). For example, the video content of a specific video channel can be provided to one or more wireless display devices in a manner that supports real-time, or near real-time, display. However, the ability of a video client to receive data in a manner consistent with real-time operation is indeterminate because it is not possible for a client to access data in a predetermined manner under CSMA/CA operation, since CSMA/CA operation requires clients to wait for current transmissions to finish before attempting to gain access to the channel. Once a current transmission is finished a specific client cannot be guaranteed access of the wireless network over a different client.

Given these limitations, as discussed, it is apparent that a device to improve the ability of a system to support real time display of video data over a wireless network would be advantageous.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

FIG. 7 is a flow diagram illustrating a method for providing video content in accordance with the present disclosure; and FIG. 8 is a flow diagram illustrating a method for providing video content in accordance with the present disclosure.

DETAILED DESCRIPTION OF THE FIGURES

In one embodiment of the present invention a gateway device notifies a plurality of wireless clients that normally access a wireless network in a shared manner using a carrier sense multiple access protocol with collision avoidance (CSMA/CA) to operate in a contention free mode of operation that prevents the wireless clients from initiating a data transfer. Once the wireless clients are prevented from initiating access to the wireless network, the gateway can transmit video content in a deterministic manner to one or more of the plurality of wireless clients. Being able to provide video content to wireless clients in a deterministic manner is an advantage over previously known methods that transmit video using CSMA/CA because a greater level of control over video quality can be achieved at one or more video clients. FIGS. 1 through 6 illustrate specific embodiment of the present invention in greater detail.

Figure 1:
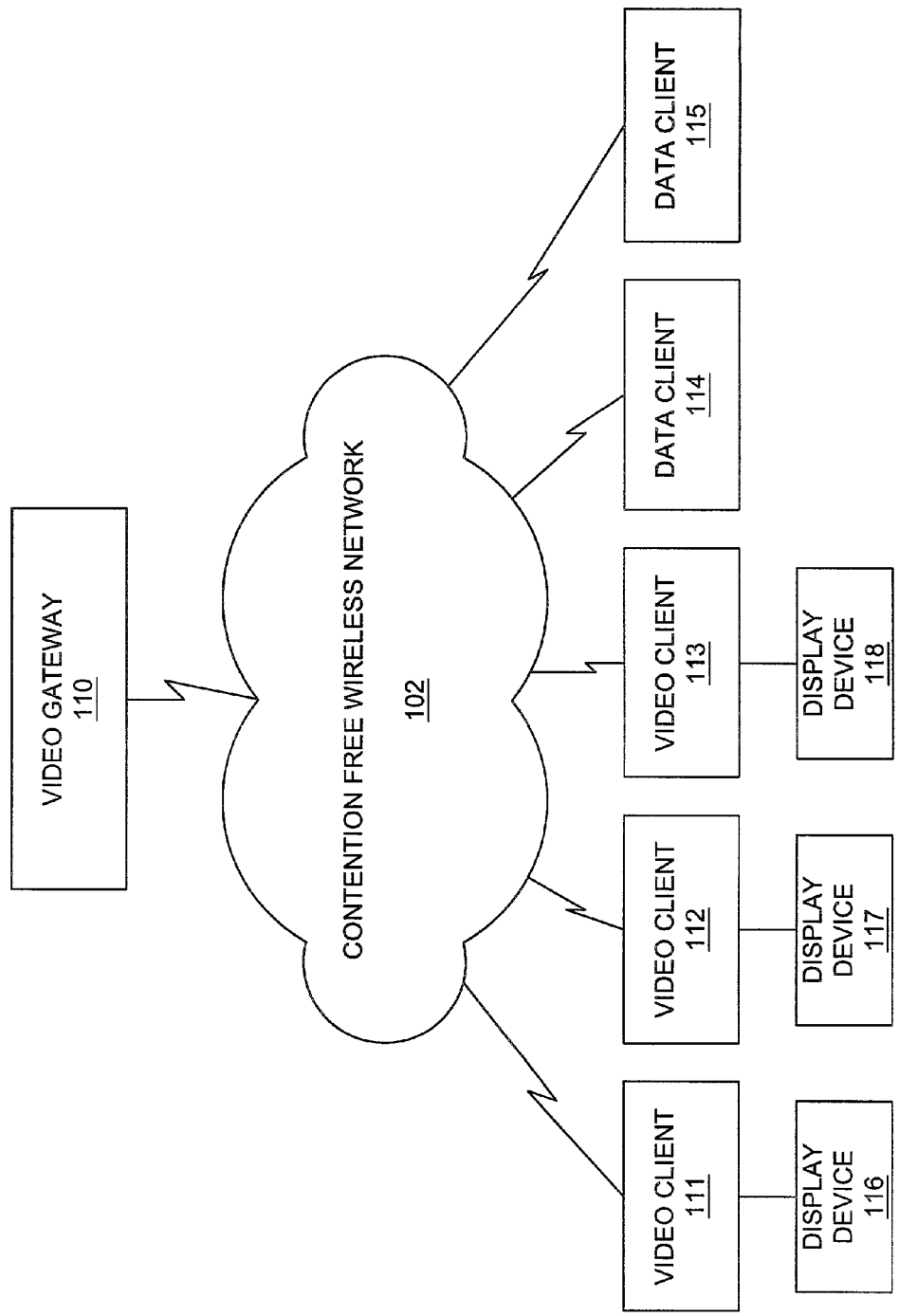
FIG. 1 is a block diagram illustrating a system for providing video content over a wireless network in accordance with a specific embodiment of the present invention.

FIG. 1 illustrates a system 100 for providing video content to wireless clients in a manner that provides for a deterministic bandwidth to the wireless clients. The system 100 includes a video gateway 110, and clients 111-115. According to a specific embodiment of the invention, the clients 111-115 communicate with the video gateway 110 through a contention free wireless network 102. The contention free wireless network 102 is enabled by placing each of the clients 111-115 in a mode of operation that prevents their initiating accesses to the wireless network 102 as discussed in greater detail herein. The use of the contention free wireless network 102 is different than known wireless networks where individual clients can operate in a contention environment (e.g. CSMA/CA) to initiate accesses.

The video gateway 110 acts as an access point that receives video content and data. The term video content is used herein to include information that is used to provide a video experience to a viewer. For example, the term video content will generally include audio information, image information, and control information. One example of a group of specific protocols that provide video content in a digital manner include MPEG (Motion Picture Experts Group) protocols, such as MPEG3.

Video content stored in an MPEG3 format, or any other format, can be provided to the video gateway 110 from a service provider or a local storage device (not illustrated). Non-video data can also be received at the video gateway 110. Examples of non-video data include files, applications, and graphics, such as would typically be associated with a data processing device such as a personal computer.

The clients 111-115 illustrated in FIG. 1 include three video clients 111-113, and data clients 114-115. The video clients 111-113 are capable of receiving and decoding video content in a real time manner. Typically, the video clients 111-113 will provide the decoded video content to a display device 116-118 for viewing, where the display devices 116-118 may be integrated components relative to the video clients 111-113, or stand alone components, such as display monitors, with respect to their respective video clients 111-113. In addition to receiving video content, individual video clients may also receive non-video data. For example, a video client can also operate to provide a user interface to the internet, wherein information associated with browsing the world wide web would be received at the video client for display. In addition, programs, files, and other data associated with personal computing devices can also be received.

Clients 114-115 represents data clients that are not being utilized, or not capable of being utilized, for the purpose of receiving and decoding video. For example, a personal computer being used to download information from the world wide web, or to transfer data files, would be considered a data client as opposed to a video client. Whether a specific client is a data client or a video client can vary depending upon the client's current use. For example, a client can be considered either a video client or a data client depending upon its current configuration and use.

Figure 2:
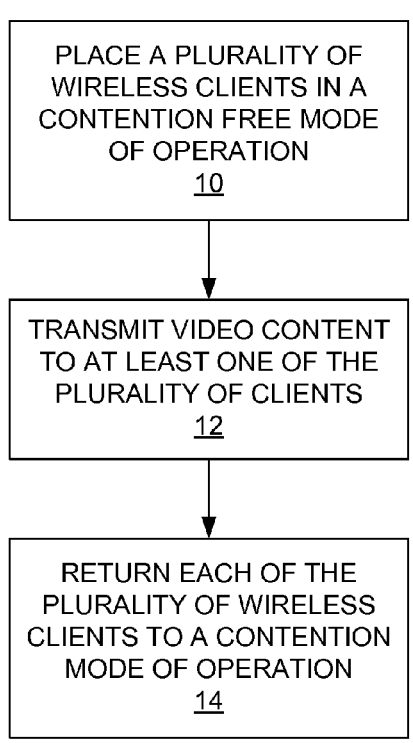
FIG. 2 is a flow diagram illustrating a method for providing video content in accordance with the present disclosure.

FIG. 2 illustrates a flow diagram representing a broad method in accordance with a specific embodiment of the present invention, and will be discussed with reference to the system of FIG. 1. At step 10, a plurality of wireless clients capable of operating in a collision/contention environment (e.g. CSMA/CA) are placed in a contention free mode of operation. For example, assuming system 100 is operating in accordance the ANSI/IEEE Standard 802.11, or one of its variations such as 802.11a or 802.11b, (referred to herein as the 802.11 standard), the system 100 can operate in distributed coordination function mode which is a contention mode of operation allowing each client 111-115, and the gateway 112, to initiate accesses over the wireless network. Alternatively, the gateway 110, acting as an access point, can place each of the clients 111-115 into a contention free mode through the use of the CF Parameter Set of the 802.11 standard. It will be appreciated that other public or private standards that support both a contention and non-contention mode of operation can be used to implement various aspects in accordance with the present invention.

At step 12, video content is transmitted to at least one of the plurality of clients. In one embodiment, the video content transmitted is intended for a specific client (e.g. client 111). In an alternate embodiment a broadcast or multicast transmission can be used to send video content to multiple clients simultaneously.

At step 14, each of the video clients is returned to a contention mode of operation. With respect to system 100 operating according to the 802.11 standard, the system 100 can alternate between a contention free mode of operation and a contention mode of operation based on a contention-free repetition rate and a contention free period that are specified in the CF Parameter Set specified in the standard. In addition, the gateway can end a contention free period prior to its scheduled termination. Note that the gateway 110 can also transmit data, including video content, to the clients 111-115 during the contention mode of operation, however, not in a deterministic manner.

In an alternate embodiment of the method of FIG. 2, a contention free mode of operation can include placing the system 100 into a mixed mode of operation between contention free operation and contention operation. For example, under the 802.11 standard, a contention free mode of operation can be a mode of operation whereby the network operates in a contention free mode a predetermined amount of time (e.g. 50%), while a contention mode of operation is considered to be a mode of operation whereby there is no scheduled contention free mode. Such a mixed mode of operation continues to be advantageous over the prior art because it allows for deterministic minimum level of operation with respect to the contention free bandwidth allocated to the video server for providing video content.

Figure 3:
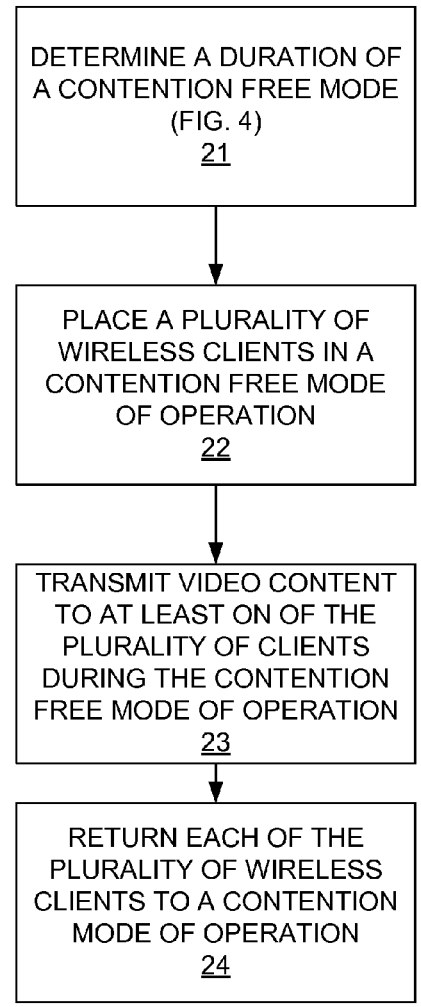
FIG. 3 is a flow diagram illustrating a method for providing video content in accordance with the present disclosure.

FIG. 3 illustrates a flow diagram representing a method in accordance with a specific embodiment of the present invention and will be discussed with reference to the system of FIG. 1. At step 21, a duration of the contention free mode of operation is determined. By determining the amount of time, or the portion of a bandwidth, that is to be dedicated to a contention free period it is possible to deterministically quantify the minimum amount of video content that can be transferred in a specific amount of time.

Figure 4:
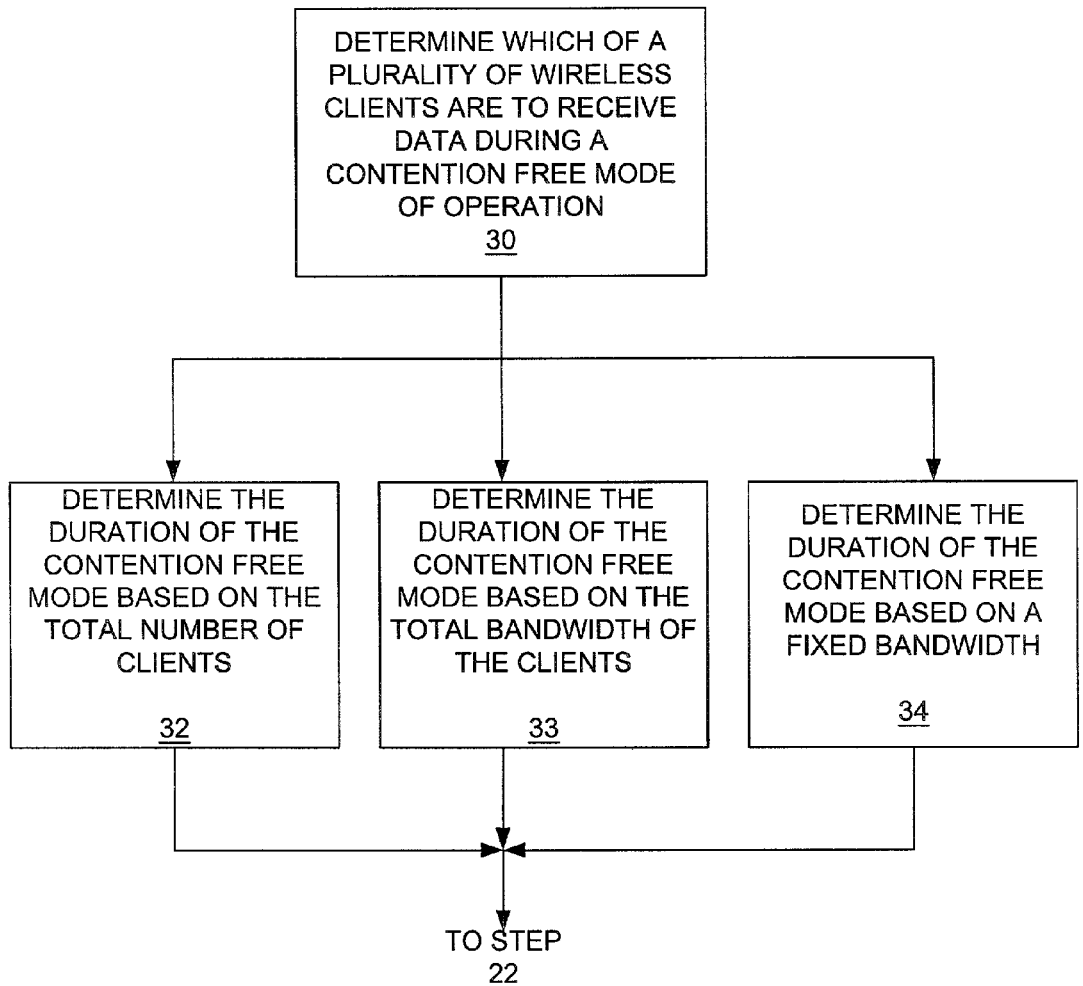
FIG. 4 is a flow diagram illustrating a method for providing video content in accordance with the present disclosure.

FIG. 4 illustrates a more detailed flow diagram for determining the duration of the contention free mode of operation. Steps 22-24 of FIG. 3 are analogous to steps 10, 12 and 14 of FIG. 2 respectively.

FIG. 4 illustrates a flow diagram illustrating specific embodiments of step 21 of FIG. 3. At step 30, it is determined which of the wireless clients 111-115 are to receive data during a specific mode of operation, such as a contention free mode of operation. In one embodiment, only the clients that are to actively receive video content are determined to receive data during the contention free mode of operation. While typically the data clients 114 and 115 will not receive video content, in a specific embodiment it is anticipated that they too could be determined to receive video content during the contention free mode. In an alternate embodiment, any client identified to receive any data during the contention free mode of operation, irrespective of the data type, can be considered to receive data during the contention free mode of operation.

Whether a specific client is to be included as receiving data can be based upon a present knowledge of data that is scheduled to be transferred to the specific client. For example, if the gateway 110 is currently in the process of providing a stream of video content to video client 111, it would be included as a wireless client to receive video. In another implementation, a specific wireless client can be included as a client to receive data based on past events or statistics. For example, a specific client can be included in the list of clients to receive data if it is known that the specific client receives data at a specific interval that is to occur during the next contention free interval.

Steps 32-35 of the method of FIG. 4 represent specific methods that can be used to determine the duration of the contention free mode of operation. The gateway 110 can use any one or combination of the steps 32-35 to determine a duration of the contention free mode.

At step 32, the duration of the contention free mode is based on the number of wireless clients that are to receive data. For example, a predetermined amount of time, or bandwidth, such as may be determined by a user or the gateway 110, can be allocated for each client that is determined to receive data. It will be appreciated that the amount of time or bandwidth to be allocated to a contention free mode of operation can be readily converted to, or determined from, an amount of data to be transmitted for a given a data rate.

At step 33 the duration of the contention free mode is based upon the total bandwidth requirements of the clients to receive data during the contention free mode of operation. For example, if wireless clients 111 and 112 are the only two clients to receive data during the contention free period, and wireless client 111 is to receive data at a rate of 1.5 Mb/s and the wireless client 112 is to receive data at a rate of 0.5 Mb/s, the total bandwidth of data that is to be transferred by the gateway 110 is 2 Mb/s. This data rate can be readily converted to a duration by knowing the current data rate capability of the wireless network of system 100. Specifically, the duration of the contention free period can be calculated by the following formula: (Total contention free desired data rate)/(total system data rate)*(period). Where the period is the interval during which a contention period and a contention free period will coexist.

In an embodiment where the total system data rate is less than the total contention free desired data rate, resulting a contention free mode of operation having a duration less than a desired duration, the gateway 110 will have to make a determination whether to not support certain clients, or to reduce bandwidth to one or more of the clients. In an embodiment where the total system data rate is greater than the total contention free desired data rate, the duration of the contention free mode of operation can be set greater than, or equal to, the desired rate. In an embodiment where the 802.11 protocol is being supported, the period can be set using the CFPRate field, and the duration of the contention free period can be set using the CFPMaxDuration field.

In one embodiment using the 802.11 protocol, the CFP-MaxDuration field is set to a value greater than the calculated desired contention free interval and terminated early by the gateway. This technique compensates for the fact that under 802.11 it is possible for a first portion of a desired contention free period to not occur because of a pending completion of a transfer that was begun during a contention based mode of operation. Therefore, to better assure deterministic bandwidth capability, the gateway can allocate more of the total wireless bandwidth than is actual needed to a contention free mode of operation, and terminate the contention free mode once the desired amount of bandwidth has been used. This provides an advantage over prior known methods of providing video content over wireless networks because a deterministic amount of bandwidth over a period of time can be assured.

At step 34, the duration of the contention free mode is fixed, based upon a predefined value, such as a system/user determined value. In this case, the amount of bandwidth to be allocated to each client can be allocated based upon the fixed bandwidth.

It will be appreciated that various combinations of steps 33-34 can be used for determining the duration of the contention free mode. For example, the duration can be a function of the bandwidth of each client up to a maximum bandwidth. Furthermore, it will be appreciated that the available data bandwidth of the wireless network can change over time. For example, with various 802.11 based standard, such as 802.11a and 802.11b, the bandwidth can vary between 54 Mb/s to 1 Mb/s depending upon the location of the individual clients.

Figure 5:
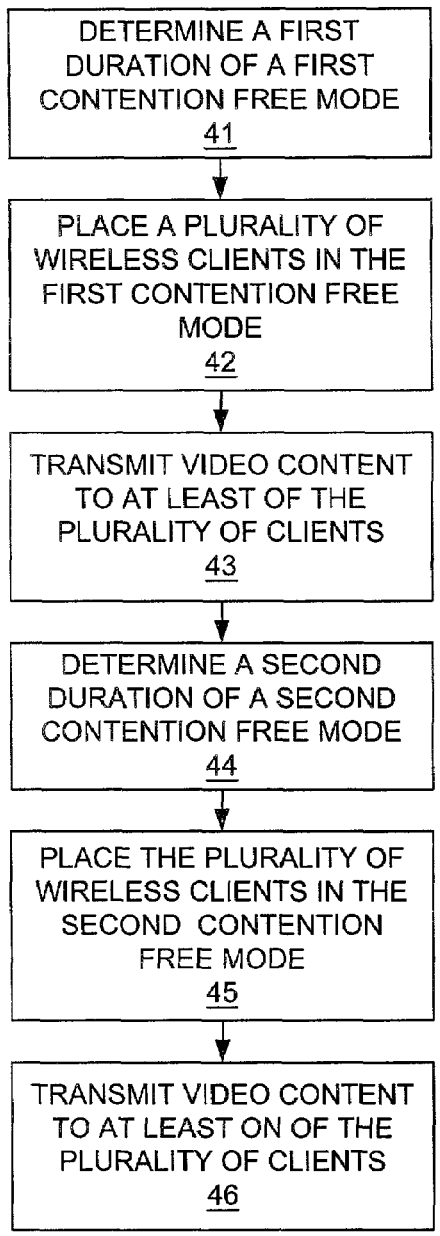
FIG. 5 is a flow diagram illustrating a method for providing video content in accordance with the present disclosure.

FIG. 5 illustrates a flow diagram representing a method in accordance with a specific embodiment of the present invention and will be discussed with reference to the system of FIG. 1. Step 41 set determines a first duration of a first contention free mode in a manner analogous to step 21. Step 42 places a plurality of clients in the first contention free mode of operation in a manner analogous to step 22. Step 43 transmits video data to at least one of the plurality of clients during the first contention free mode of operation.

At step 44, a second duration of a second contention free mode is determined by the gateway 110, where the second contention free mode has a different contention free duration. In operation, the gateway will periodically determine whether the data requirements of wireless clients 111-115, have changed and modify the duration of the contention free period accordingly. For example, if more clients now are needing a greater data bandwidth, the bandwidth of the contention free period can be increased. Likewise the bandwidth can be decreased when necessary.

At step 45, the clients are placed in a the second contention free mode of operation for the second duration. As previously discussed, the actual duration specified to the client can be greater than the second duration, thereby allowing the gateway terminate the contention free mode early. In addition to allowing the gateway 110 to provide and terminate a longer duration time to meet the desired duration time, the gateway can also change the duration of the duration contention free period by merely ending the contention free period at a different time. In this embodiment of the invention, the gateway 110 can configure the wireless clients to be in contention free mode for a maximum amount of time, for example, 90% of the time, and obtain varying contention free duration periods by internally monitoring the elapsed time from the start of each contention free period and issuing a CFEnd indicator (802.11) to terminate the contention free period once the desired duration is realized.

At step 46, video content is transferred to at least one of the plurality of clients while in the second mode of contention free operation.

Figure 6:
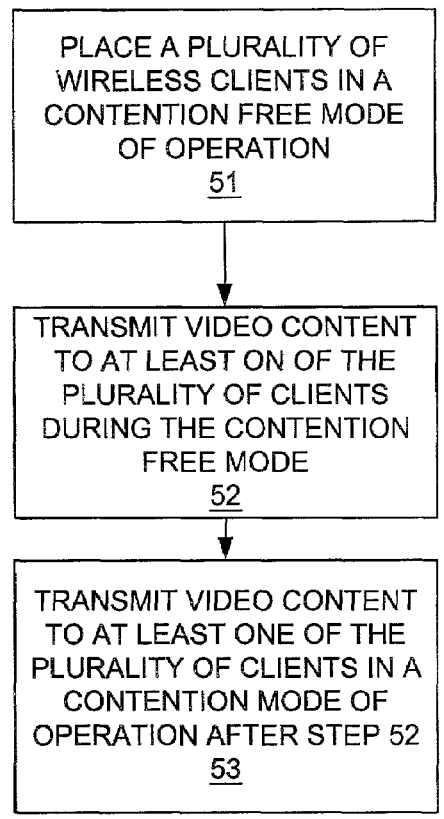
FIG. 6 is a flow diagram illustrating a method for providing video content in accordance with the present disclosure.

FIG. 6 illustrates a flow diagram representing a method in accordance with a specific embodiment of the present invention and will be discussed with reference to the system of FIG. 1. Step 51 places a plurality of wireless clients in a contention free mode of operation in a manner analogous to step 10. Step 52 transmits video data to at least one of the plurality of clients when in the contention free mode of operation in a manner analogous to step 12. At step 53 video data is transferred to at least one of the video clients 111-113 when in a contention mode (CSMA/CA) of operation.

In accordance with the method of FIG. 6, a specific video client, such as video client 111, can receive data during both the contention free period and the contention period. In an alternate embodiment, one client can receive video content only during the contention mode of operation, while other clients can receive video content only during contention free modes of operation, or during either contention or contention free modes of operation.

FIG. 7 illustrates a flow diagram representing a method in accordance with a specific embodiment of the present invention and will be discussed with reference to the system of FIG. 1. Step 61 places a plurality of wireless clients in a contention free mode of operation in a manner analogous to step 10. Step 62 transmits video data to at least one of the plurality of clients when in the contention free mode of operation in a manner analogous to step 12. Step 63 transmits video content in a specific order to the clients 111-115 that are to receive video content during the contention free mode. The order, or priority, that the clients 111-115 are to receive data can be determined by the gateway 110 based on bandwidth requirements of each client, by user/client settings, or in a fixed manner. For example, the gateway 110 can transmit data to each client in a round robin manner, or based on a priority indicator. In an alternative embodiment, the gateway 110 can poll each pollable client during a contention free period, such as at the beginning of each contention free period or an occasional contention free period, to obtain information used to set the priority of each client. For example, the gateway can poll each pollable video client to determine the fullness of its video buffer. Those clients that have near empty video buffers would be given a higher priority that those clients that have near full video buffers.

In yet another embodiment of the present invention, the gateway 112 can multicast, or broadcast data to multiple clients receiving the same data. This mode of operation is especially useful in video applications where more than one display device is to display to the same channel.

FIG. 8 illustrates a flow diagram representing a method in accordance with a specific embodiment of the present invention and will be discussed with reference to the system of FIG. 1. At step 71, it is determined which clients 111-115 are pollable during a contention free mode of operation. For example, a wireless network based on 802.11 requires each client to be able to receive data during a contention free mode of operation. However, an individual client does not have to support being polled. When an individual client is polled, it is being queried by the gateway, acting as a control point, whether the individual client has data it wishes to transmit. If so, it can be granted permission to do so.

At step 72, a duration of the contention free mode is determined. In addition to basing the duration of the contention free mode on the factors previous discussed, the duration of the contention free mode can be based on the number of clients that are pollable. By basing the duration on whether a client is pollable, accommodations can be made by the gateway to provide deterministic bandwidth support for the reception of data from the gateway 112.

At step 73, a subset of the clients 111-115 are placed in a contention free mode of operation. For example the video clients 111 and 112 can be placed in a contention free mode of operation.

At step 74, client 111 is be polled to request video control information during the contention free mode of operation. For example, the client 111 can be polled to provide specific operation or state information, such as current or changed video settings. A specific request to a client during contention free mode can be accomplished by appending a POLL message that is interpreted by the client to determine what information, if any, to provide to the polling device. In an alternate embodiment, one of the 802.11 reserved message types could be used to create a system specific POLL message. In another embodiment, each pollable client is polled periodically during the contention free mode of operation to determine any operating changes. Otherwise, it would be possible for a change in the clients operation to be missed or delayed during a the contention mode of operation.

At step 75, video content is provided to client 111 based on the video control information. Note that the video content of step 75 does not necessarily occur during the same contention free period that the video control information is received. For example, if the video client 111 indicates during step 74 that the channel to be displayed has changed, the gateway may not be able to obtain the new channel information fast enough to provide it during the current contention free period. However, in response to a request from a client for a different channel to be displayed the gateway 110 can modify, or cancel, the content scheduled to be transmitted during the current and or some subsequent contention free periods.

Step 76 indicates that a client that is not polled can also receive video content during the contention free mode of operation.

In the preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
   determining a duration based on an amount of video content to be transmitted to a first wireless client and a bandwidth allocated to transmitting the video content to the first wireless client;
   transmitting an information packet for the first wireless client and a second wireless client to facilitate the first wireless client and the second wireless client entering a mode of operation for the duration, wherein during the mode of operation the first wireless client and the second wireless client are prevented from initiating data transfers; and
   transmitting packets comprising video content for the first wireless client during the mode of operation.

2. The method of claim 1, wherein the mode is a first mode and further comprising:
   transmitting packets comprising video content for the second wireless client during a second mode of operation, wherein during the second mode of operation the first wireless client and the second wireless client are enabled to initiate data transfers.

3. The method of claim 2 further comprising:
   transmitting packets comprising video content for the first wireless device and the second wireless device during the second mode of operation.

4. The method of claim 3 further comprising:
   determining an order for transmitting packets comprising video content to the first wireless device and the second wireless device.

5. The method of claim 3, wherein the packets comprising video content for the first wireless device and the second wireless device are the same packets.

6. The method of claim 1, comprising:
   determining the desired bandwidth before transmitting the information packet.

7. The method of claim 6, wherein the duration is a first duration, the desired bandwidth is a first desired bandwidth, and the information packet is a first information packet, the method further comprising:
   determining a second duration based on a second desired bandwidth to be allocated to transferring video content; and
   transmitting a second information packet for the first wireless client and the second wireless client to facilitate the first wireless client and the second wireless client entering the mode of operation for the second duration, wherein during the mode of operation the first wireless client and the second wireless client are prevented from initiating data transfers.

8. The method of claim 7 further comprising:
   transmitting packets comprising video content for the first wireless client after transmitting the second information packet.

9. The method of claim 1, wherein the duration is indicated in the information packet.

10. The method of claim 1, wherein the duration is based upon a total number of wireless clients to receive video content.

11. The method of claim 1, wherein the information packet is a first information packet and the mode is a first mode, and wherein:

transmitting the first information packet includes specifying a specific duration of the mode of operation that is longer than the duration;
and further comprising:
transmitting a second information packet to the first wireless client and the second wireless client to facilitate the first wireless client and the second wireless client entering a second mode of operation, wherein during the second mode of operation the first wireless client and the second wireless client are enabled to initiate data transfers.

12. The method of claim 1, wherein the duration is a first duration, the desired bandwidth is a first desired bandwidth, the mode is a first mode, and the information packet is a first information packet, wherein:
transmitting the first information packet includes specifying a duration of the first mode of operation that is shorter than the first duration;
and further comprising:
transmitting a second information packet to the first wireless client and the second wireless client to facilitate the first wireless client and the second wireless client entering a second mode of operation, wherein during the second mode of operation the first wireless client and the second wireless client are enabled to initiate data transfers.

13. The method of claim 1, wherein the mode is a first mode and further comprising:
transmitting packets comprising video content for the first wireless client during a second mode of operation, wherein during the second mode of operation the first wireless client and the second wireless client are enabled to initiate data transfers.

14. A method comprising:
determining each wireless client of a subset of a plurality of wireless clients that is to receive video content during a mode of operation;
transmitting at least one information packet for the plurality of wireless clients to facilitate the plurality of wireless clients entering the mode of operation for a predetermined duration based on a total number of wireless clients of the subset of wireless clients, wherein during the mode of operation the plurality of wireless clients are prevented from initiating data transfers; and
transmitting packets comprising video content for each of the subset of wireless clients during the mode of operation.

15. The method of claim 14, wherein the predetermined duration further is based on the bandwidth requirements of each of the subset of wireless clients.

16. The method of claim 14, wherein the predetermined duration is based on a fixed bandwidth requirement.

17. The method of claim 14, wherein the predetermined duration is indicated in the at least one information packet.

18. A system comprising:
means for determining a duration based on an amount of video content to be transmitted to a first wireless client and a bandwidth allocated to transmitting the video content to the first wireless client;
means for transmitting at least one information packet for a first wireless client and a second wireless client to facilitate the first wireless client and the second wireless client entering a mode of operation for the duration, wherein during the mode of operation the first wireless client and the second wireless client are prevented from initiating data transfers; and
means for transmitting packets comprising video content for the first wireless client during the mode of operation.

19. The system of claim 18, wherein the duration is indicated in the at least one information packet.

20. The system of claim 18, wherein the duration further is based upon a total number of wireless clients to receive video content.

* * * * *